(12) United States Patent
Marukawa et al.

(10) Patent No.: US 6,275,003 B1
(45) Date of Patent: Aug. 14, 2001

(54) BATTERY PACK

(75) Inventors: Shuhei Marukawa; Ko Watanabe, both of Toyohashi; Yasuyoshi Fukao, Toyota, all of (JP)

(73) Assignees: Matsushita Electric Industrial Co., Ltd., Osaka; Toyota Jidosha Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/590,636

(22) Filed: Jun. 8, 2000

(30) Foreign Application Priority Data

Jun. 10, 1999 (JP) .................................. 11-163336
Mar. 23, 2000 (JP) .................................. 12-081103

(51) Int. Cl.[7] .............................. H02J 7/00; A01M 6/42
(52) U.S. Cl. ......................... 320/116; 320/107; 429/149
(58) Field of Search ................................ 320/116, 107; 429/99, 149, 152, 157

(56) References Cited

U.S. PATENT DOCUMENTS 5,558,950    9/1996    Ovshinsky et al. . .
5,886,501    3/1999    Marks et al. . .

FOREIGN PATENT DOCUMENTS 0771037      5/1997    (EP) .
WO98/31059   7/1998    (WO) .

*Primary Examiner*—Peter S. Wong
*Assistant Examiner*—Gregory J Toatley, Jr.
(74) *Attorney, Agent, or Firm*—Jordan & Hamburg LLP

(57) ABSTRACT

A plurality of prismatic battery modules, each having a positive electrode connecting terminal and a negative electrode connecting terminal are arranged at opposite ends thereof, in a row such that the positive and negative electrode connecting terminals are directed alternately in opposite directions, thereby constituting a battery pack. A first and a second connection modules disposed at either end of the battery pack for connecting the battery modules in series are constituted by mutually linking, in a relatively displaceable manner, module connectors that comprise metal connection elements integrally held in a resin frame.

13 Claims, 11 Drawing Sheets

BATTERY PACK

BACKGROUND OF THE INVENTION

The present invention relates to a battery, pack constructed with a plurality of prismatic battery modules arranged in a row and electrically connected with each other by means of connection modules.

FIG. 13 shows a conventional battery pack 41 constituted by arranging a plurality of prismatic battery modules in a row adjacent each other and connecting these electrically in series. End plates 43 are arranged at the opposite ends in the direction of juxtaposing arrangement of battery modules 42. The battery pack is unified by binding together the battery modules 42 with these two end plates 43 at either end by means of binding straps 44. The battery modules 42 are electrically connected by means of connection modules 46, 47 comprising a plurality of metal connecting elements that effect connection between connecting terminals 45 of adjacent battery modules 42. The connection modules 46, 47 are fixedly mounted in synthetic resin holders by insertion molding.

In one of the connection modules 46 at one end in the longitudinal direction of battery modules 42, there are also insertion-molded battery voltage detection terminals, while, in the other connection module 47 at the other end, only the metal connection elements are insertion-molded. The battery voltage detection terminals are connected to a battery voltage detection device 48.

However, with a battery pack 41 as described above, there are variations in the position of the connecting terminals 45 of the battery modules 42 in the direction orthogonal to the direction of arrangement of the battery modules 42. This means that the connecting terminals 45 are not positioned on the same plane, and when, in this condition, connecting terminals 45 are connected by directly screwing onto connection modules 46, 47, there is the problem that load acts on the connecting terminals 45, impairing the sealing characteristics between the connecting terminals 45 and the battery cases. A further problem was that, due to the variations in the thickness dimensions of the battery modules 42, it was impossible to eliminate variations in the positions of connecting terminals 45 in the direction of arrangement of battery modules 42. Such variations can sometimes be so large that screwing attachment and fixing of the connection modules 46, 47 is difficult.

A further problem was that, when such a battery pack 41 was arranged within the metal body of a vehicle, there was a risk that contact between the metal body and connecting terminals 45 of battery pack 41 resulting for example from a vehicle collision could result in the formation of a short circuit.

Yet a further problem was that, since there was a considerable voltage difference between adjacent connecting terminals 45, 45 that were not mutually connected and the spatial distance between these was short, there was a risk of a short circuit being generated if dust collected between them.

SUMMARY OF THE INVENTION

In view of the above, an object of the present invention is to provide a battery pack wherein, even if there are variations in the position of the connecting terminals of the battery modules, fixing of the connection modules can be performed easily without compromising sealing performance of the connecting. Terminals.

A further object of the present invention is to provide a battery pack, wherein, even though the battery pack is mounted in a metallic body of a vehicle, there is no risk of short-circuiting in the event of collisions etc, and wherein short-circuiting due to accumulation of dust between the connecting terminals cannot occur.

A battery pack according to the present invention comprises:

a plurality of prismatic battery modules, each of the plurality of battery modules having a positive electrode connecting terminal and a negative. Electrode connecting terminal arranged at opposite ends in the longitudinal direction of the battery modules, the plurality of battery modules being arranged in a row such that the positive electrode connecting terminal and the negative electrode connecting terminal are directed alternately in opposite directions; and a first connection module and a second connection module arranged respectively at opposite ends in the longitudinal direction of the battery modules, wherein the first and second connection modules comprise a plurality of module connectors that are linked together in a relatively displaceable manner, the module connectors being constructed with metal connection elements, that are integrally held in a resin frame, for connecting the positive and negative connecting terminals of adjacent battery modules.

Even if there are variations in the position of the connecting terminals in the direction orthogonal to the direction of juxtaposing arrangement of the battery modules, these can be absorbed by displacement of each of the module connectors, when the metal connecting elements are fixed with screws. No large load acts on the connecting terminals and sealing between the cases of the connecting terminals can therefore be improved. Also, even if there are variations in the pitch space of the connecting terminals due to the variations in the position of the connecting terminals in the direction of juxtaposing arrangement of the battery modules, since the module connectors are mutually displaceable, fixing of the connection modules can be achieved without difficulty.

Specifically, it is preferable that adjacent module connectors be separated by slits, the ends of voltage detection terminal holding frames that extend from the module connectors being mutually integrally linked, or that the adjacent module connectors be linked through U-shaped linkage sections.

Synthetic resin covers may be provided for covering the top and outside faces of the connection modules. When the battery pack is arranged in the metal body of a vehicle, even if the metal body is deformed in a collision etc, contact between the connecting terminals and the metal body can be prevented by these covers, thereby enabling the risk of short-circuiting to be prevented.

In a portion of the inside surface of the cover facing a connecting terminal, there nay be provided an annular rib surrounding the periphery of a portion of the connecting terminal that projects from the outer surface of a nut and is of a height greater than the height of this projecting portion. Thereby, the risk of short-circuiting can be eliminated since any risk of the covers being pierced by the connecting terminals due to these connecting terminals of small contact area pressing on the covers is avoided.

Preferably, the sheet thickness of at least the portion of the cover facing the connecting terminal should be made greater than the height of the portion projecting from the outer surface of the nut of the connecting terminal. Thereby, even if, for example, deformation of the annular ribs makes them unable to fulfill their function, the risk of short-circuiting can be eliminated.

Also, if reinforcing ribs are provided in lattice fashion in at least the portion of the outer surface of the cover facing the connecting terminal, and its periphery, the risk of short-circuiting can be eliminated even if external forces from various directions act thereon.

Insulating means may be provided on the connection modules such as to protrude into the gap between the ends of adjacent battery modules opposite the spaces between the module connectors. Thereby, entry of dust, which facilitates short-circuiting between connecting terminals, can be prevented, and so insulation between the connecting terminals can be ensured.

Specifically, insulating means may be provided on the module connectors such as to protrude into the gap between the ends of adjacent battery modules opposite the spaces between the module connectors, or, insulating means may be provided on the U-shaped linkage sections such as to protrude into the gap between the ends of adjacent battery modules opposite the spaces between the module connectors. Alternatively, V-shaped sections may be formed at the tip of the U-shaped linkage sections such as to protrude into the gap between the ends of adjacent battery modules opposite the spaces between the module connectors.

Furthermore, if an anti-dust tongue that prevents entry of dust between the connection modules and the battery modules by contacting the upper surface of the battery modules and protruding into the gap between battery modules is provided on the cover, entry of dust, which facilitates short-circuiting between the connecting terminals, can be prevented, thereby farther ensuring installation between the connecting terminals.

At the opposite ends of the covers that cover the connecting terminals of the battery modules at the opposite ends, there may be provided opening/closure portions capable of opening/closure, by means of bending portions, in a condition with the covers being mounted. Thereby, during connection of the leads with respect to the positive electrode terminals and negative electrode terminals of the entire battery pack, connection can be achieved in a safe manner by an easy operation since the risk of short-circuiting by contacting live parts such as the other connecting terminals or conductive parts of the connection module with the hand or a tool during the connection operation can be eliminated by effecting connection with the opening/closure portion open.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION Of THE DRAWINGS

FIG. 6 illustrates a first cover in this embodiment, FIG. 6A being a front view, while

PREFERRED EMBODIMENTS OF THE INVENTION

One embodiment of a battery pack according to the present invention is described below with reference to FIG. 1 to FIG. 12.

Figure 1:
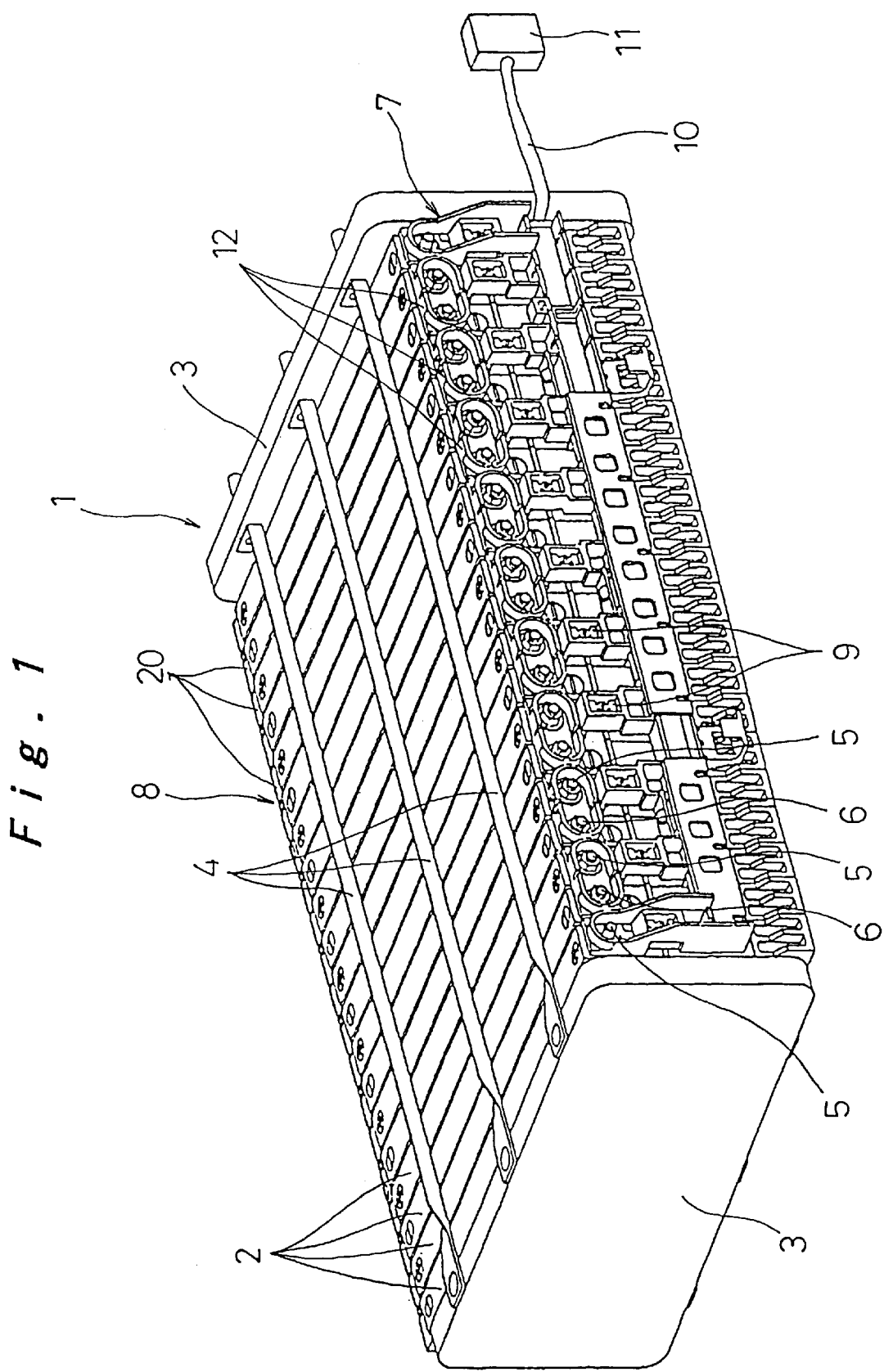
FIG. 1 is a perspective view showing one embodiment of a battery pack according to the present invention.

In FIG. 1, a battery pack 1 according to this embodiment is constituted such that it can be suitably employed as the drive power source for an electric vehicle. It is constituted by arranging a plurality (in the illustrated example, 20) of battery modules 2 of rectangular cross section and flat plate shape consisting of nickel metal hydride batteries adjacent each other and connecting them electrically in series.

Battery modules 2 are constituted by an integrated case constructed by integrally connecting a plurality of rectangular cases (six in this embodiment) having short side faces of small width and long side faces of large width juxtaposed with each other. Cells are constituted within each case by accommodating electrolyte and electrode groups having a large number of positive electrode plates and negative electrode plates parallel to these long side faces and stacked in the short side face direction with separators therebetween. The battery module 2 is constituted by connecting these six cells in series within the integrated case.

End plates 3 are arranged at the opposite ends in the direction of juxtaposing arrangement of battery modules 2 which are arranged next to each other, the upper end edges and lower end edges of these being tightly tied together by a plurality of binding straps 4 respectively arranged with suitable intervals, thereby constituting the battery pack 1.

Connecting terminals 5, 6 of positive electrodes and negative electrodes project at the upper edge of both end faces in the longitudinal direction of battery modules 2, battery modules 2 being adjacently arranged such that their positive electrodes and negative electrodes are directed alternately in opposite directions. Thus, battery modules 2 are connected in series by using a first connection module 7 to connect connecting terminals 5, 6 on one side, in a direction orthogonal to the direction of juxtaposing arrangement of battery modules 2, and using a second connection module 8 to connect the connecting terminals 5, 6 on the other side.

On the first connection module 7, there are provided voltage detection terminals 9 respectively corresponding to the connecting terminals 5, 6 of the positive electrode and negative electrode at both ends thereof and to the connecting terminal 5 of the intermediate positive electrode, these voltage detection terminals 9 being connected to a battery voltage detection device 11 through a lead 10. No voltage detection terminals 9 are provided on the second connection module 8.

Figure 2:
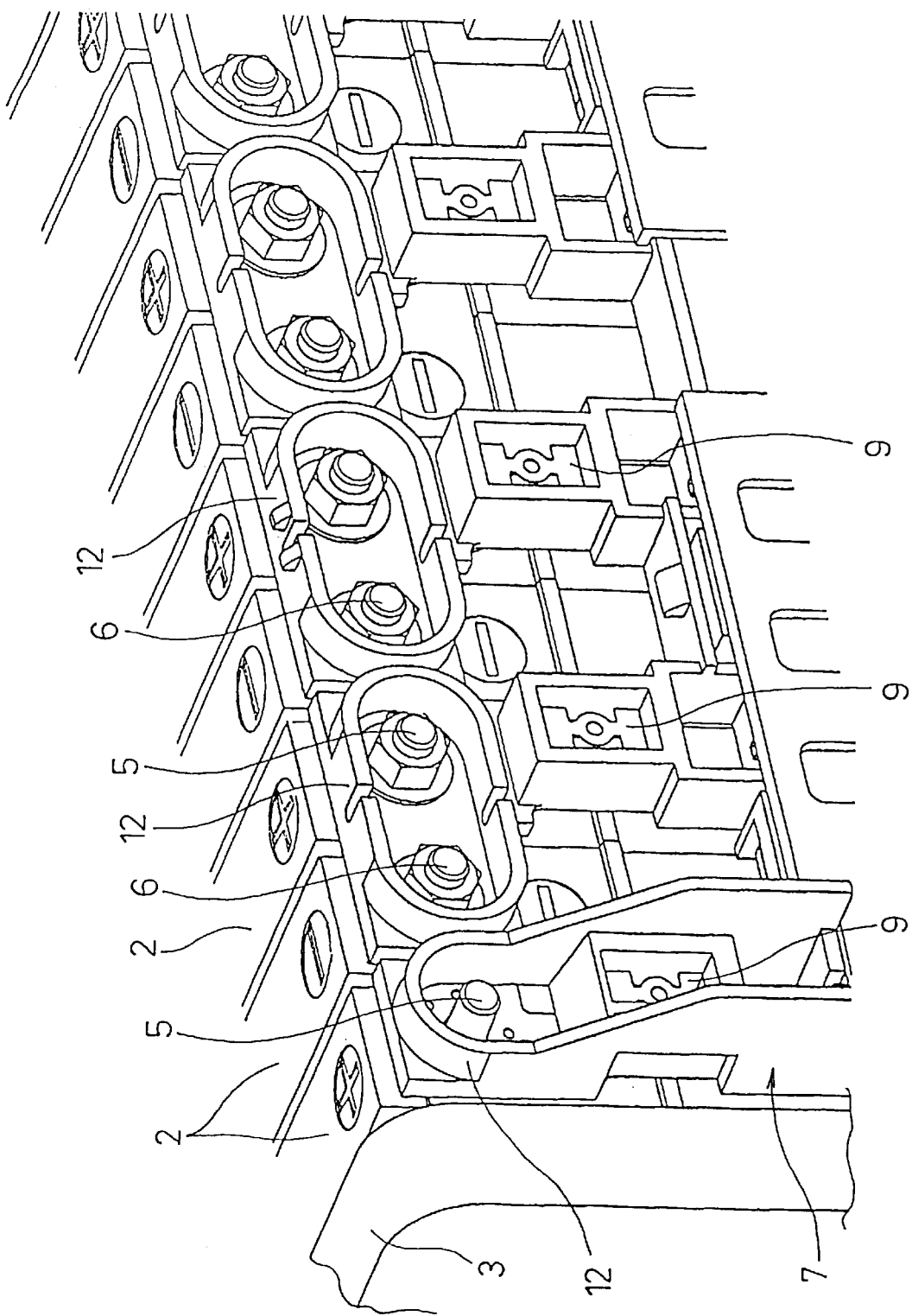
FIG. 2 is a perspective view to a larger scale of a detail of this embodiment.
Figure 3B:
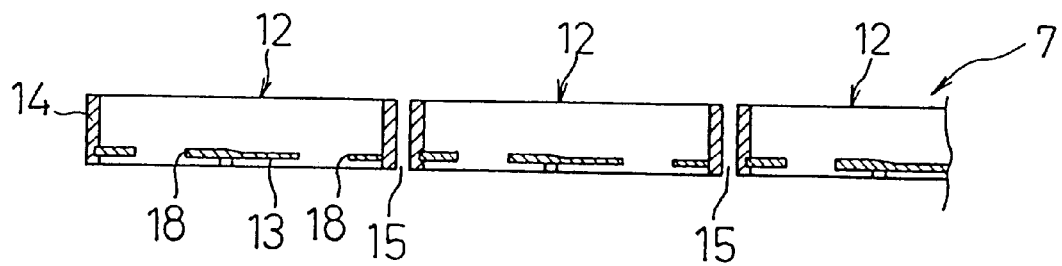
FIG. 3 illustrates a connection module on one side in this embodiment, FIG. 3A being a front view and FIG. 3B being a cross-sectional view along the line IIIB—IIIB of FIG. 3A.
Figure 3A:
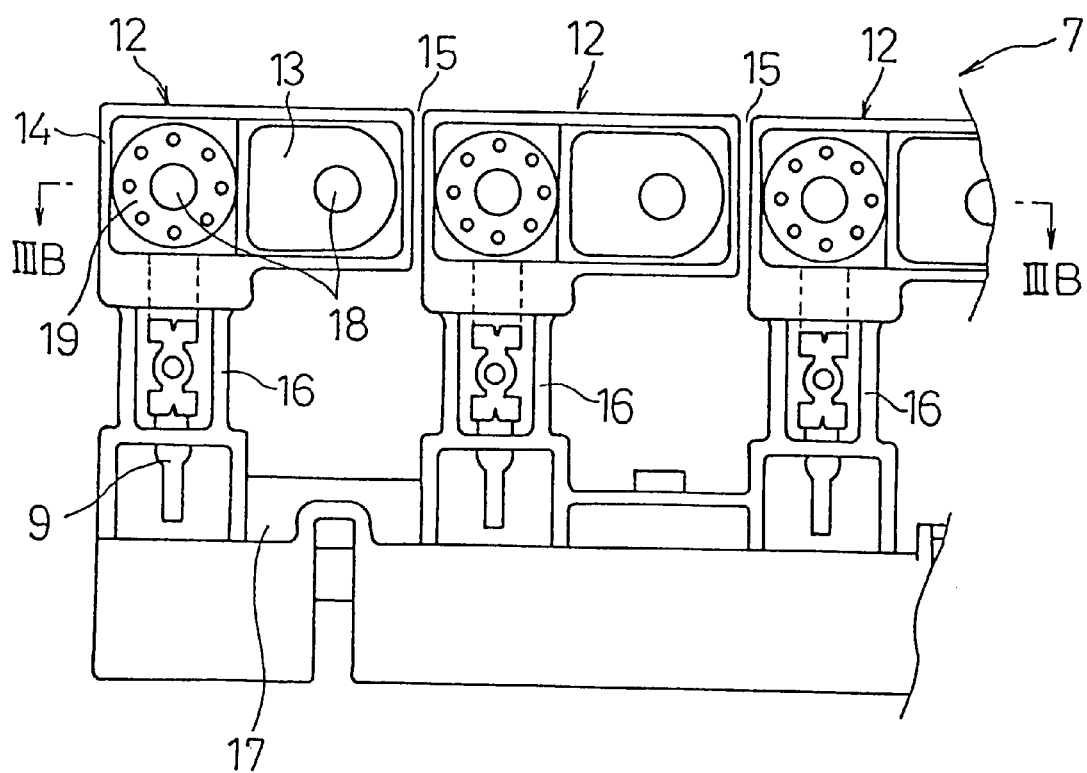

As shown in FIG. 2, FIG. 3A, and FIG. 3B, the first connection module 7 comprises a plurality of module connectors 12, that are capable of displacing relative to each other. The module connectors 12, that are held in a resin frame 14, respectively have metal connecting elements 13 for connecting a pair of adjacent connecting terminals 5, 6 and are arranged so that they are mutually separated by means of slits 15. The ends of voltage detection terminal holding frames 16 that extend integrally downwards from each module connector 12 are integrally linked by a linkage frame 17. Through-holes 18 are formed in the metal connection elements 13, through which the connecting terminals 5 and 6 pass, and a voltage detection terminal plate 19 formed with a voltage detection terminal 9 is arranged in overlapping fashion at the bottom end on one side of the portion where the connecting terminal 5 is arranged, being insertion molded in this state. As shown in FIG. 2, the module connectors 12 at either end of the first connection module 7 are respectively provided with a metal connecting element 13 and voltage detection terminal plate 19 that are abutted by a single connecting terminal 5 or 6.

Figure 4B:
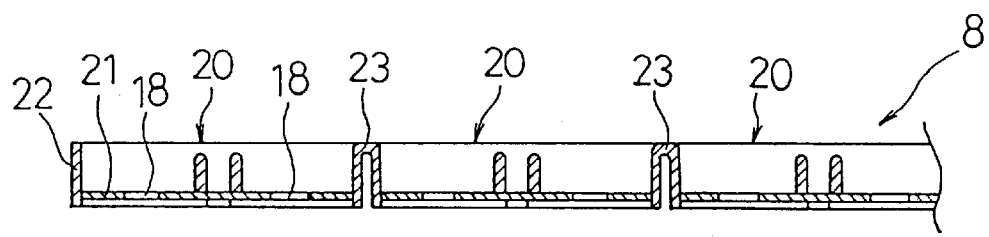
FIG. 4 illustrates a connection module on the other side in this embodiment, FIG. 4A being a front view and FIG. 4B being a cross-sectional view along the line IVB—IVB of FIG. 4A.
Figure 4A:
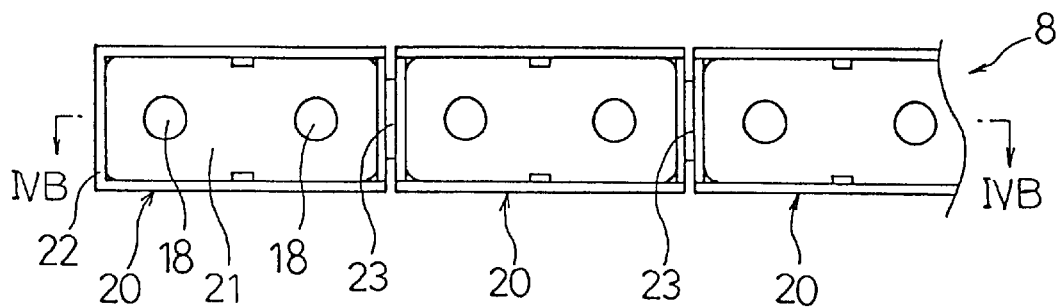
Figure 5A:
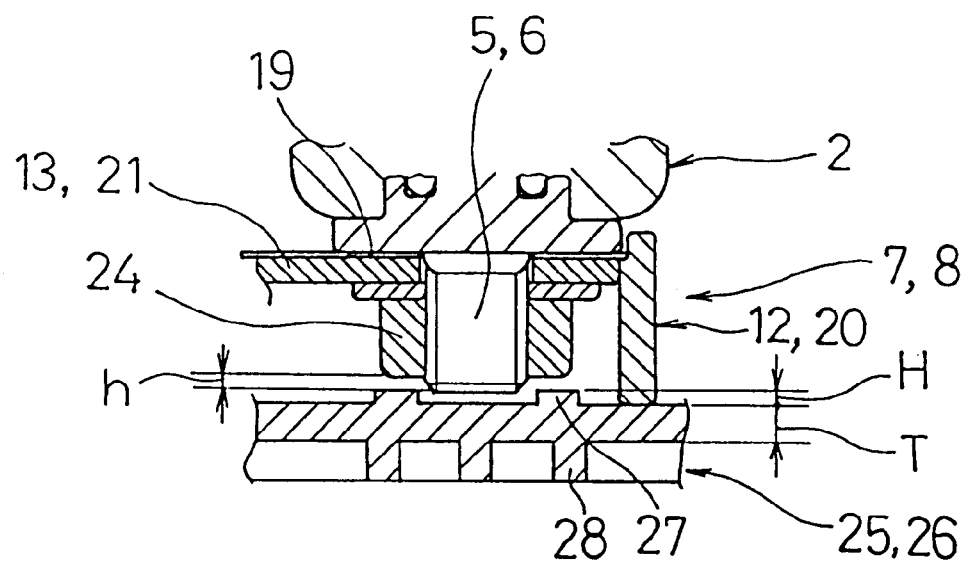
FIG. 5 illustrates how a cover is mounted in this embodiment, FIG. 5A being a transverse cross-sectional plan view and FIG. 5B being a front view thereof.
Figure 5B:
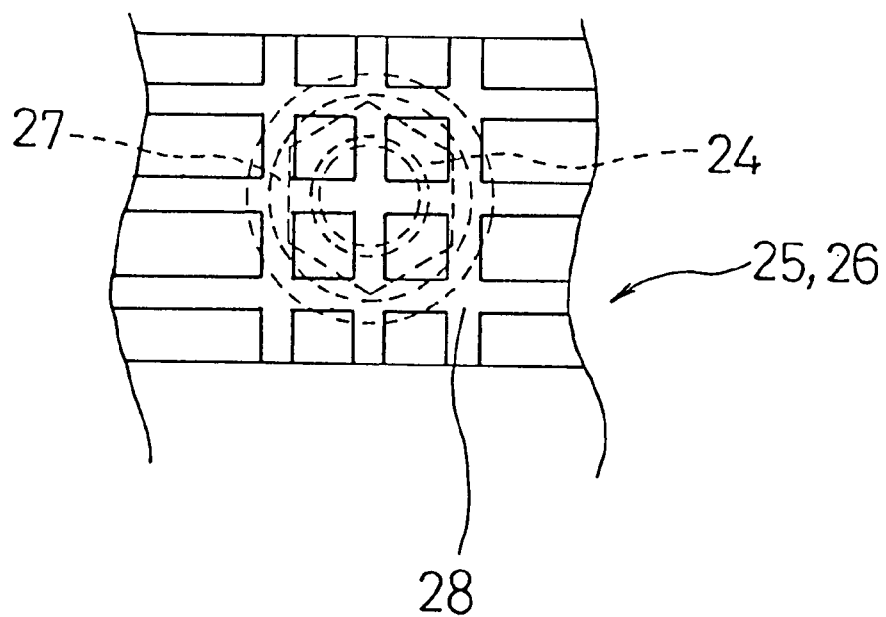

The second connection module 8, as shown in FIGS. 4A and 48, comprises a plurality of module connectors 20, that are constituted with metal connecting elements 21 held in resin frames 22 for connecting a pair of adjacent connecting terminals 5, 6. The resin fraes 22 of adjacent module connectors 20 are mutually linked through U-shaped linkage sections 23; thus, module connectors 20 are constituted such as to be capable of relative displacement. Metal connecting elements 21 may be integrally held by insertion molding in the resin frames 22, or may be mounted in pre-molded resin frames 22.

The top and outside faces of the first and second connection modules 7 and 8 are covered by first and second covers 25, 26 made of synthetic resin, as shown in FIG. 5A to FIG. 7. First cover 25 is arranged to extend a long way downwards so as to cover the connections of the voltage detection terminal holding frame 16 or voltage detection terminals 9 with the lead 10. As shown in detail in FIG. 5A, in a portion on the inside surface of these covers 25, 26 facing the connecting terminals 5, 6, there are provided annular ribs 27 such as to surround from the outside the periphery of portions of connecting terminals 5, 6 that project beyond nuts 24 that are screw-threaded thereon, being of height H greater than the height h of these projecting portions. The sheet thickness T of at least the portion of these covers 25, 26 facing connecting terminals 5, 6 is formed greater than the height h of the portions of connecting terminals 5, 6 that project beyond the outside surface of the nuts 24. Furthermore, as shown in FIG. 5B, reinforcing ribs 28 are formed in lattice fashion in at least the portion of the outer surface of the covers 25, 26 facing connecting terminals 57 6, and the periphery thereof.

Figure 8:
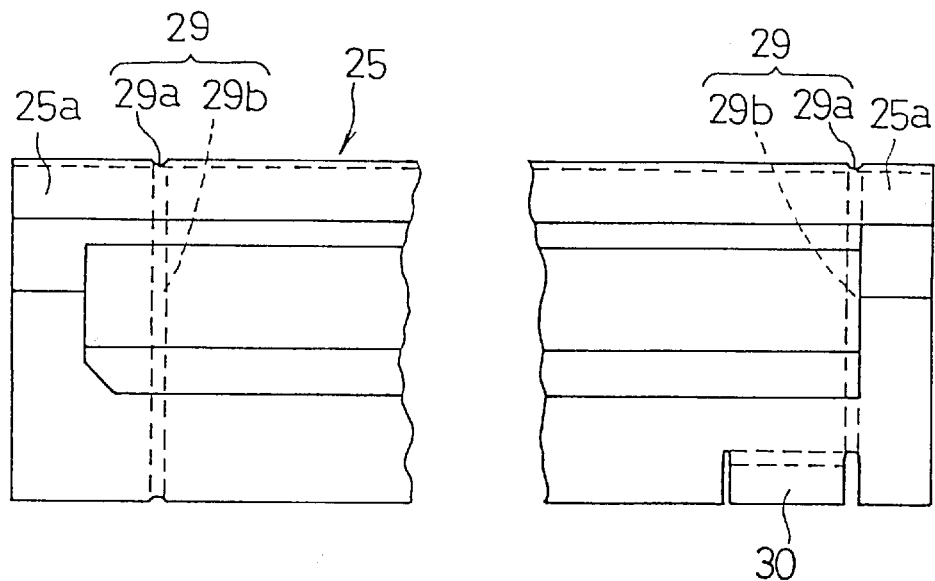
FIG. 8 is a front view of opposite ends of the first cover in this embodiment.
Figure 9:
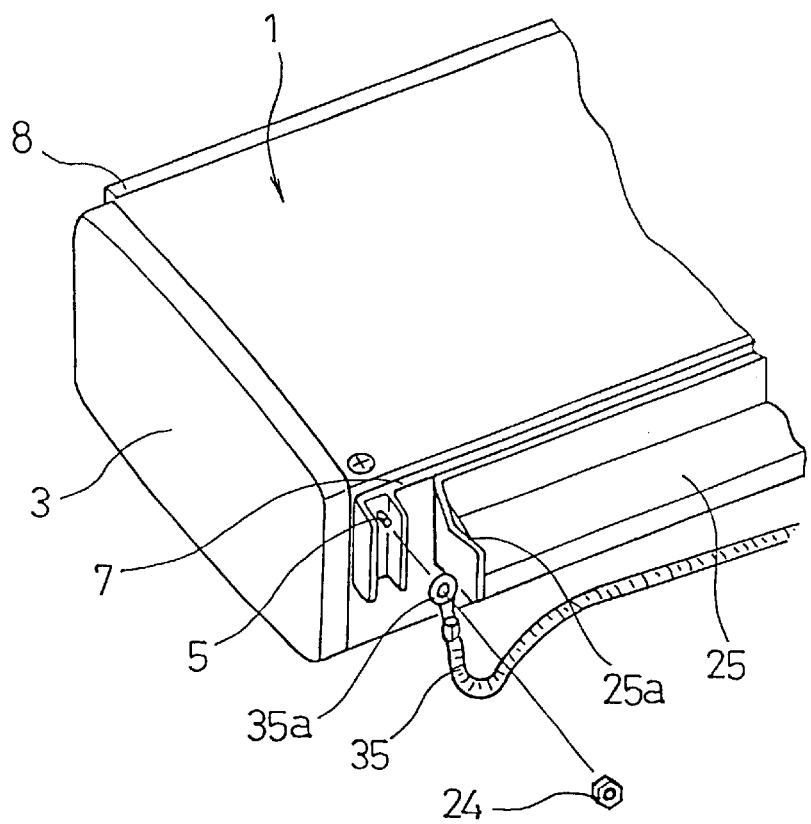
FIG. 9 is a partial perspective view showing how leads are connected in the battery pack in this embodiment.

As shown in FIG. 8 and FIG. 9, at the opposite ends of the first cover 25 which covers the connecting terminals 5, 6 at either end of the first connection module 7 constituting the positive electrode terminal and negative electrode terminal of the battery pack 1 as a whole, there is formed an opening/closure part 25a by means of a bending part 29 constituted so As to be capable of bending, so that the opening/closure part 25a can open and close in a condition with the cover 25 being mounted. Bending part 29 is constructed by forming a slit 29a in a portion of the cover 25 that covers the top of the connection module 7 and forming a reduced thickness part 29b that functions as a resin hinge in the front face plate. Opening/closure part 25a can be opened/closed by hinging about the reduced thickness part 29b and, in the open condition, this condition is maintained by resilient deformation of the cross-sectional shape in which the front face plate of the cover 25 is bent. As shown in FIG. 8, at the bottom of the right hand side end of the first cover 25, there is formed an opening/closure part 30 of the same construction whereby the lead 10 is led out.

Figure 10:
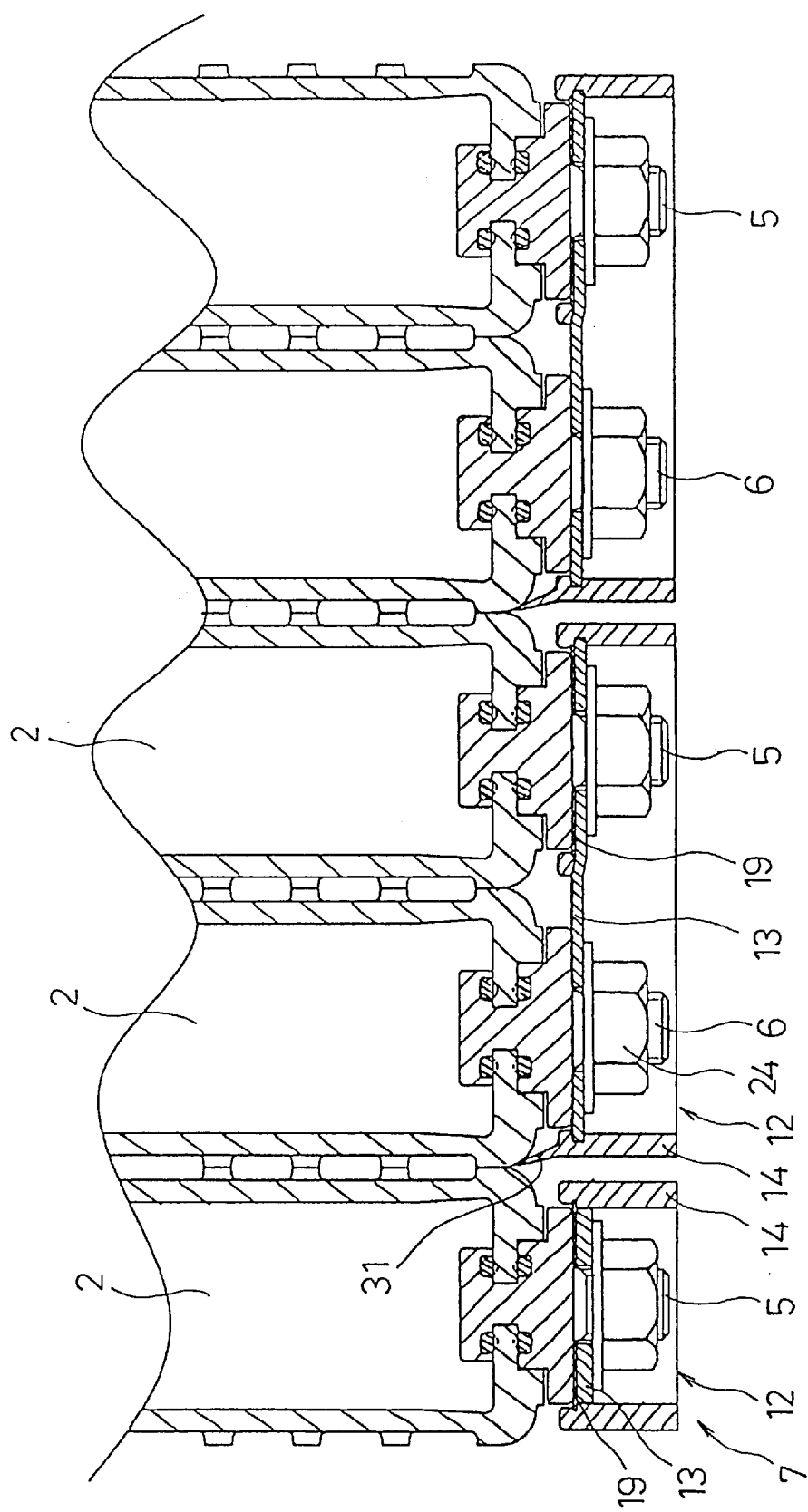
FIG. 10 is a transverse cross-sectional plan view showing how a first connection module is mounted in this embodiment.
Figure 11:
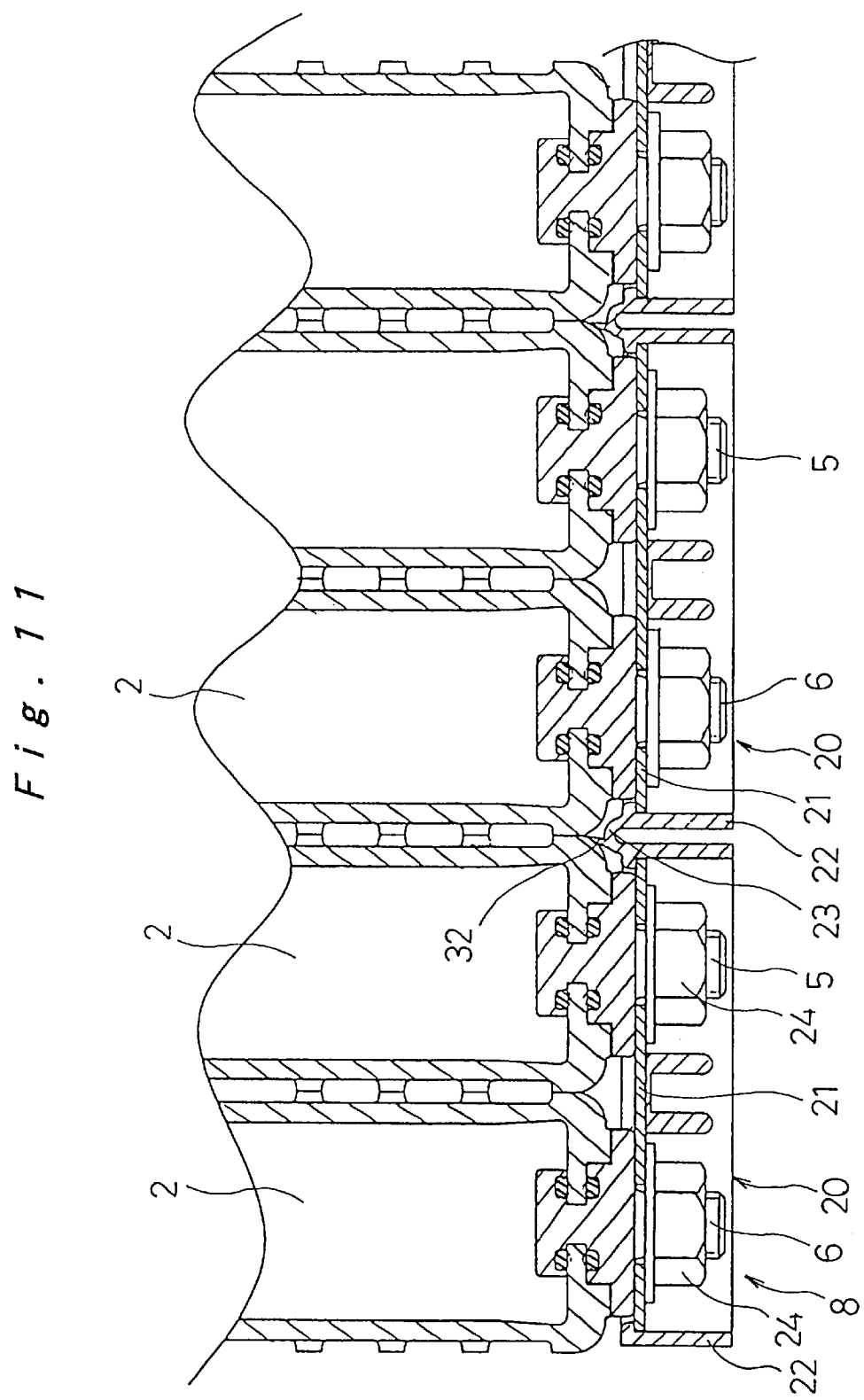
FIG. 11 is a transverse cross-sectional plan view showing how a second connection module is mounted in this embodiment.
Figure 12:
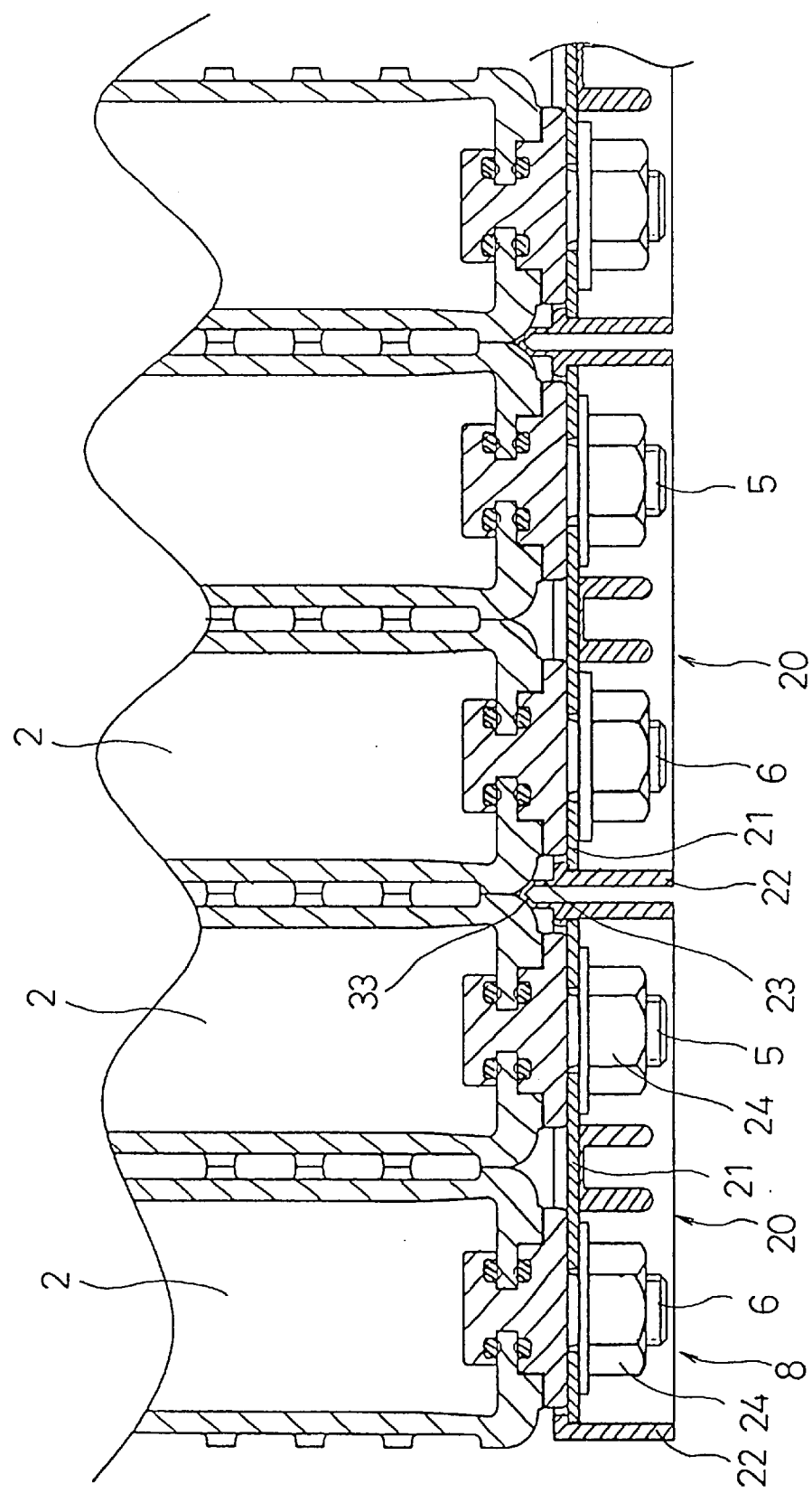
FIG. 12 is a transverse cross-sectional plan view showing how a modified form of the second connection module is mounted in this embodiment.
Figure 13:
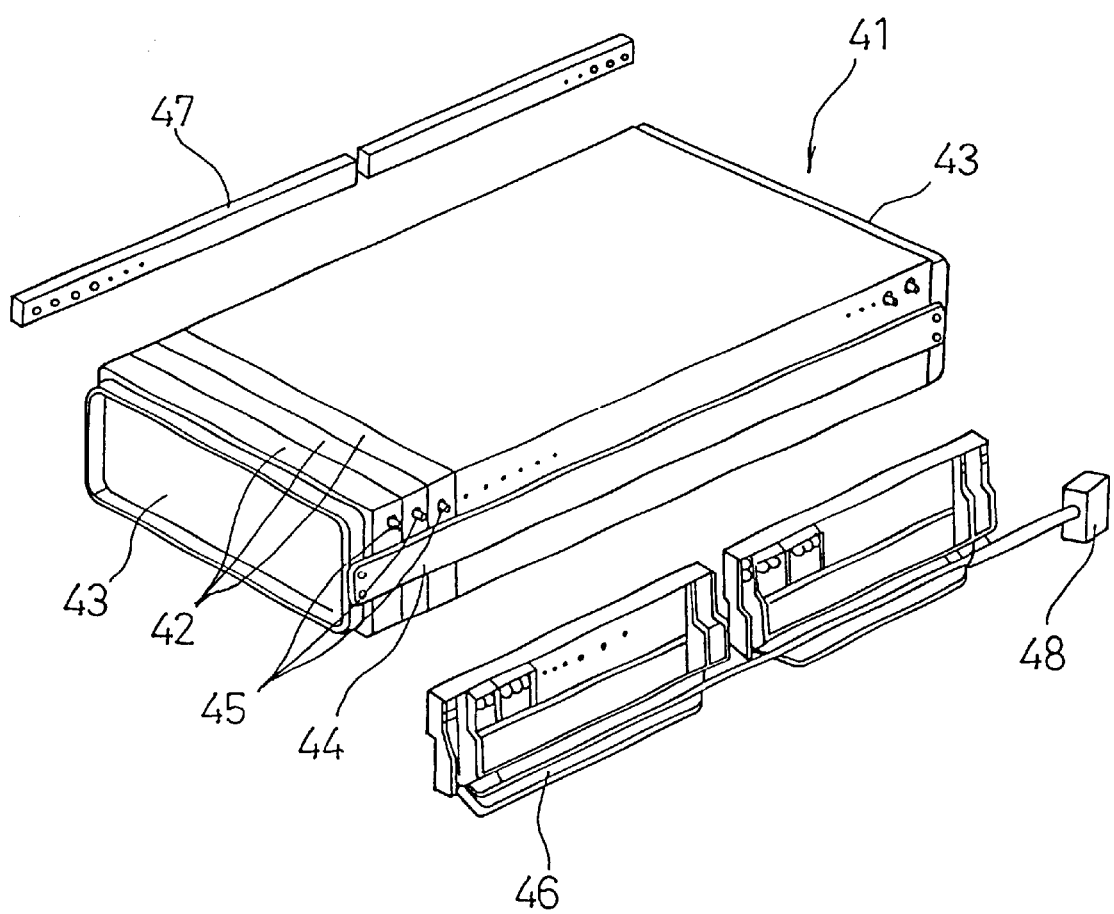
FIG. 13 is a perspective view of a prior art example of a battery pack, with the connection modules separated.

Furthermore, in the first connection module 7, as shown in FIG. 10, insulating leaves 31 that improve insulation property between the connecting terminals 5 and 6 protrude from the resin frame 14, protruding into the gap between the ends of adjacent battery modules 2 opposite the spaces between the module connectors 12, 12. In the second connection module 8, as shown in FIG. 11, insulating leaves 32 to improve insulation property between the connecting terminals 5, 6, that project into the gap between the ends of adjacent battery modules 2 opposite the spaces between the module connectors 20, 20, are provided on the U-shaped linkage sections 23. Instead of the insulating leaves 32, as shown in FIG. 12, the tip of U-shaped linkage section 23 could be formed in a V-shaped section 33 to improve insulation property between the connecting terminals by protruding into the gap between the ends of adjacent battery modules 2 opposite the spaces between the module connectors 20, 20.

Figure 6A:
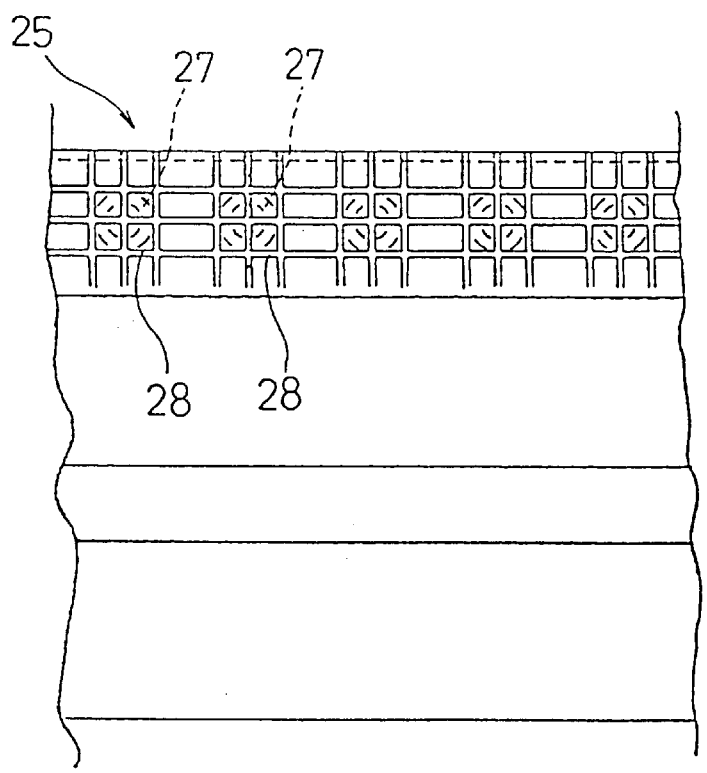
Figure 6B:
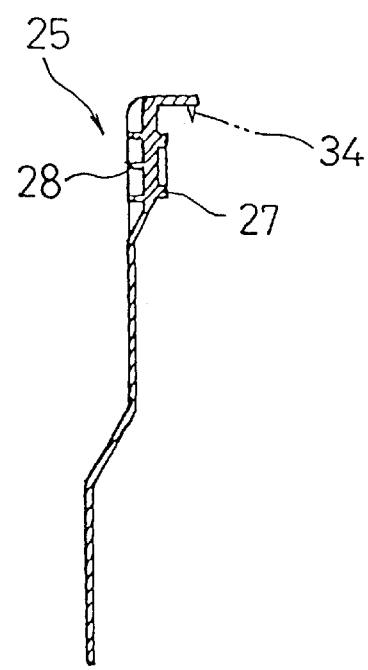
FIG. 6B is a vertically sectioned side view.
Figure 7:
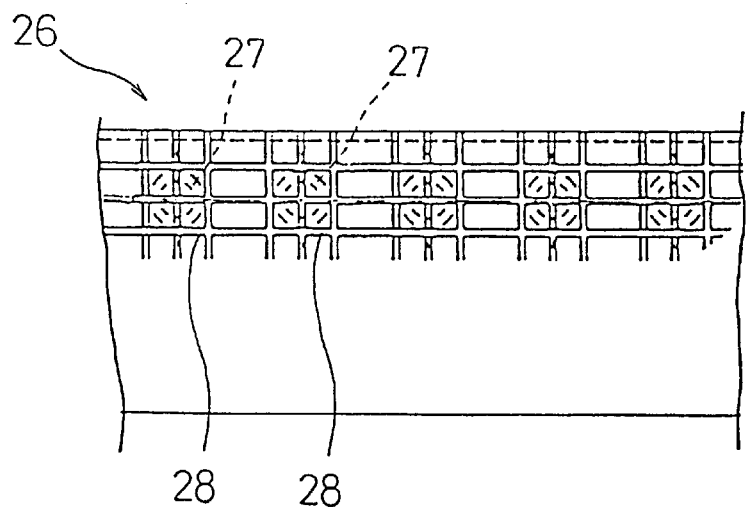
FIG. 7 is a front view of a second cover according to this embodiment.

Furthermore, as shown by the imaginary lines in FIG. 6B, it is desirable to provide an anti-dust tongue 34 that is downwardly directed from the tip of the part of the first and second covers 25, 26 that covers the top of the first and second connection modules 7, 8, to prevent entry of dust between the battery modules 2 and connection modules 7, 8. The anti-dust tongue 34 should preferably be arranged such that it contacts the upper surface of the battery modules 2 and protrudes into the gap between the battery modules 2.

With the battery pack 1 constructed as above, even if there are variations in the position of the connecting terminals 5, 6 in the direction orthogonal to the direction of juxtaposing arrangement of the battery modules 2, these can be absorbed since the module connectors 12, 20 are capable of relative displacement, when the metal connecting elements 13, 21 of the first and second connection modules 7, 8 are tightened and fixed. Thus, no large load acts on the connecting terminals 5, 6, and the sealing characteristics between the cases of the connecting terminals 5, 6 can be improved.

Even if there are variations in the pitch space of the connecting terminals 5, 6 in the direction of juxtaposing arrangement of the battery modules 2 because of the variations in the thickness of battery modules 2, since module connectors 12, 20 are capable of mutual displacement, mounting and fixing of the first and second connection modules 7 and 8 can easily be achieved.

Also, since the top and outside faces of the first and second connection modules 7, 8 are respectively covered by the first and second covers 25, 26 made of synthetic resin, when this battery pack 1 is arranged in the metal body (not shown) of a vehicle, even if the metal body is deformed in a vehicle collision, contact between the connecting terminals 5, 6 and the metal body can be prevented by these covers 25, 26, thereby enabling the risk of short-circuiting to be prevented. In particular, the risk of short-circuiting can be eliminated since, thanks to the formation of the annular ribs 27 in the portions facing the connecting terminals 5, 6 on the inside of these covers 25, 26, there is no possibility of covers 25, 26 being pierced by the connecting terminals 5, 6 due to these connecting terminals 5, 6 of small contact area pressing on the covers 25, 26.

Furthermore, since the sheet thickness of covers 25, 26 at least in the portion facing the connecting terminals 5, 6 is made greater than the height h of the portion of the connecting terminals 5, 6 projecting from the outside face of the nuts 24, even if deformation of the annular ribs 27 makes them unable to fulfill their function, the risk of short-circuiting can be eliminated. Also, thanks to the reinforcing ribs 28 provided in lattice fashion on the outside surface of the covers 25, 26, even if external forces are applied from various directions, the risk of short-circuiting can be eliminated, When the leads are connected to the positive electrode terminal 5 and negative electrode terminal 6 of the entire battery pack 1, as shown in FIG. 9, when the opening/closure part 25a at the opposite ends is opened in a condition with the cover 25 still mounted, this open condition is maintained, so connection can be achieved by fitting the connecting terminals 35a at the tips of leads 35 on to positive electrode terminal 5 and negative electrode terminal 6, and tightening the nuts 24. Since, during this connection operation, live parts such as the other connecting terminals 5, 6 or conductive parts of the first connection module 7 remain covered by the cover 25, there is no risk of short-circuiting caused by contacting live parts with the hand or a tool. Thus, connection can be achieved in a safe manner by an easy operation.

Also, since the insulating leaves 31, 32 or V-shaped sections 33 are provided on the first and second connection modules 7, 8 to improve insulation between the connecting elements by protruding into the gap between the ends of adjacent battery modules 2 opposite the spaces between the module connectors 12, 12 and 20, 20, insulation between connecting terminals 5, 6 can be more reliably ensured, since entry of dust, which facilitates short-circuiting between connecting terminals 5, 6, can be prevented.

Furthermore, by providing anti-dust tongues 34 on the first and second covers 25, 26 in the gap between the battery modules 2 to prevent entry of dust between the connection modules 7, 8 and battery modules 2, entry of dust which facilitates short-circuiting, between the connecting terminals 5, 6 can be further prevented and insulation between connecting terminals 5, 6 further secured.

As will be clear from the above description, with the battery pack of the present invention, the connection modules are constituted by mutually linking, in relatively displaceable manner, module connectors that comprise metal connection elements held in a resin frame for connecting a pair of adjacent connecting terminals. Therefore, even if there are variations in the position of the connecting terminals in the direction orthogonal to the direction of juxtaposing arrangement of the battery modules, these can be absorbed by displacement of each of the module connectors, when the metal connecting elements are fixed with screws. No large load acts on the connecting terminals and sealing between the cases of the connecting terminals can therefore be improved. Also, even if there are variations in the pitch space of the connecting terminals due to the variations in the position of the connecting terminals in the direction of juxtaposing arrangement of the battery modules, since the module connectors are mutually displaceable, fixing of the connection modules can be achieved without difficulty.

Although the present invention has been fully described in connection with the preferred embodiment thereof; it is to be noted that various changes and modifications apparent to those skilled in the art are to be understood as included within the scope of the present invention as defined by the appended claims unless they depart therefrom.

What is claimed is:

1. A battery pack, comprising:
a plurality of prismatic battery modules, each of the plurality of battery modules having a positive electrode connecting terminal and a negative electrode connecting terminal arranged at opposite ends in the longitudinal direction of the battery modules, the plurality of batter modules being arranged in a row such that the positive electrode connecting terminal and the negative electrode connecting terminal are directed alternately in opposite directions;
a first connection module and a second connection module arranged respectively at opposite ends in the longitudinal direction of the battery modules; the first and second connection modules each including a plurality of module connectors that are linked together in a relatively displaceable manner, the module connectors being constructed with metal connection elements, that are integrally held in a resin frame, for connecting the positive and negative connecting terminals of adjacent battery modules.

2. The battery pack according to claim 1 further comprising frames for holding voltage detection terminals extending from each of the module connectors, ends of the frames being integrally linked, and adjacent module connectors being mutually separated by slits.

3. The battery pack according to claim 1 further comprising U-shaped linkage sections for linking adjacent module connectors.

4. The battery pack according to claim 1 further comprising synthetic resin covers for covering the top and outside faces of the first and second connection modules.

5. The battery pack according to claim 4 further comprising: a nut and an annular rib, wherein the synthetic resin cover has an inside surface and the positive and negative connecting terminal are fixed on the battery module by the nut, and in a portion of the inside surface of the synthetic resin cover facing the positive or the negative connecting terminal, there is provided the annular rib surrounding the periphery of a portion of the positive or negative connecting terminal that projects from the outer surface of the nut, and is of a height greater than the height of this projecting portion of the positive or negative connecting terminal.

6. The battery pack according to claim 5 wherein a sheet thickness of at least the portion of the synthetic resin cover facing the positive or negative connecting terminal is made greater than the height of the portion projecting from the outer surface of the nut of the positive or negative connecting terminal.

7. The battery pack according to claim 4 further comprising reinforcing ribs, wherein the reinforcing ribs are provided in lattice fashion in at least the portion of the outer surface of the synthetic resin cover facing the positive or negative connecting terminal, and its periphery.

8. The battery pack according to claim 1 further comprising insulating means, wherein said insulating means are provided on the first and second connection modules such as to protrude into a plurality of gaps between the ends of adjacent battery modules facing the spaces between adjacent module connectors.

9. The battery pack according to claim 2 further comprising insulating means wherein said insulating means are provided on the module connectors such as to protrude into a plurality of gaps between the ends of adjacent battery modules facing the spaces between adjacent module connectors.

10. The battery pack according to claim 3 further comprising insulating means wherein insulating means are provided on the U-shaped linkage sections such as to protrude into a plurality of gaps between the ends of adjacent battery modules facing the spaces between adjacent module connectors.

11. The battery pack according to claim 3 further comprising V-shaped sections wherein said V-shaped sections are formed at the tip of the U-shaped linkage sections such as to protrude into a plurality of gaps between the ends of adjacent battery modules facing the spaces between adjacent module connectors.

12. The battery pack according to claim 4 further comprising means for preventing entry of dust between the battery modules wherein the means for preventing entry of dust between the battery modules and the first and second connection modules are provided on the synthetic resin covers such as to contact an upper surface of the battery modules and to protrude into a plurality of gaps between adjacent battery modules.

13. The battery pack according to claim 4 further comprising bending portions wherein portions at either end of the synthetic resin covers that cover the positive or negative connecting terminal of the battery modules at either end of the battery pack are formed and are capable of opening and closing, by means of bending portions, while said synthetic resin covers remain mounted.

* * * * *